United States Patent
Nelson

(10) Patent No.: US 6,651,595 B1
(45) Date of Patent: Nov. 25, 2003

(54) AVIAN CERVICAL RESTRAINT COLLAR

(76) Inventor: Gary H. Nelson, 9299 Mooring Cir., Fort Myers, FL (US) 33912

(*) Notice: Subject to any disclaimer, the term of this patent is extended or adjusted under 35 U.S.C. 154(b) by 0 days.

(21) Appl. No.: 10/261,143

(22) Filed: Oct. 1, 2002

(51) Int. Cl.[7] ............................................. A01K 15/04
(52) U.S. Cl. ......................................... 119/815; 119/856
(58) Field of Search ..................... 119/713–715, 814, 119/815–853, 856; 602/18; D30/144, 152, 199

(56) References Cited

U.S. PATENT DOCUMENTS

| | | | | |
|---|---|---|---|---|
| 1,321,819 A | * | 11/1919 | Gottschalk | 119/713 |
| 4,476,814 A | * | 10/1984 | Miller | 119/821 |
| 5,697,328 A | * | 12/1997 | Hunter | 119/714 |
| 6,044,802 A | * | 4/2000 | Schmid et al. | 119/856 |
| 6,244,222 B1 | * | 6/2001 | Bowen | 119/856 |
| 6,382,140 B2 | * | 5/2002 | Wexler | 119/837 |
| 6,463,887 B1 | * | 10/2002 | Thomas | 119/850 |

* cited by examiner

Primary Examiner—Charles T. Jordan
Assistant Examiner—Kimberly S. Smith

(57) ABSTRACT

A unique lightweight spherical avian cervical restraint collar composed of two hemispheres joined together to have height, width, and depth is disclosed. The collar has properties that act both as a physical barrier and a means of limiting the bending motion of the bird's neck, which properties are incorporated into one structure of reduced proportions and are provided simultaneously. The continuous smooth curvature of the outer circumference of the spherical collar and internal fastening mechanism further deters damage to or a removal of the invention by the bird.

11 Claims, 3 Drawing Sheets

AVIAN CERVICAL RESTRAINT COLLAR

CROSS REFERENCES TO RELATED APPLICATIONS (none)

STATEMENT REGARDING FED SPONSORED R & D (none)

REFERENCES CITED

| | | |
|---|---|---|
| 6,129,054 | Campbell | Oct. 10, 2000 |
| 6,044,802 | Schmid, et al. | Apr. 4, 2000 |
| 5,915,337 | Klinkhart, et al. | Jun. 29, 1999 |
| 5,787,842 | Shmoldas | Aug. 4, 1998 |
| 5,778,828 | Klinkhart, et al. | Jul. 14, 1998 |
| 5,697,328 | Hunter | Dec. 16, 1997 |
| 5,197,414 | Kanakura: Yuhko | Mar. 30, 1993 |

FIELD OF INVENTION

The invention relates to a cervical restraint device for use on a psittacine bird to prevent feather plucking, self-inflicted trauma, and removal of or damage to medically applied healing aids used in the treatment of an injured bird. The device may be applied for short or long periods of time and may be repeatedly placed on or taken off the bird with relative ease.

BACKGROUND OF THE INVENTION

Prior art forms of avian cervical restraint collars are either constructed in a flat or in a conical structure or a combination of both. The flat or conical circular collar is worn around the neck of the bird and extending outwardly equally in all directions to act as a physical barrier to a bird attempting to reach around the collar. The cylindrical tube collar is similarly positioned around a bird's neck in partial or full extension to prevent the beak of the bird from reaching lower body parts by restricting the bending motion of the neck. Additionally, cloth padding has been added to prior art forms.

Many birds are able to grasp these collars on the peripheral edges, at overlapping edges, or at exposed fasteners to effectively chew the collar down to an ineffective size, release the fasteners, or endanger themselves with sharp or jagged edges as a result of the chewing. Fasteners include metal snaps, nuts and bolts, plastic strips woven through slots, cloth ties, and tape.

U.S. Pat. No. 5,197,414 illustrates a device mentioned above. This patent shows a dog collar formed as a funnel or a cone and is designated to be primarily used on dogs. The collar is used mainly to prevent a groomer from being bitten or the dog from licking wounds on its body.

U.S. Pat. No. 5,697,328 discloses a therapeutic collar for birds that includes a sheet formed in a rectangular configuration. The sheet is then formed into a cylindrical configuration. The end edges are releasably fastened to each other. The invention at hand is formed into a sphere having a continuously curved outer surface.

U.S. Pat. No. 5,779,828 describes a protective pet collar that is made of two sheets of flexible material and is fastened around an animal's neck for preventing the animal from bending its neck and thereby prevent the animal from biting or licking an affected injured area. The invention at hand is a rigid sphere.

U.S. Pat. No. 5,787,842 reveals a radially projecting restrictive pet collar using an adjustable fastener to apply it to a pet's neck. The collar forms a cylindrical shape which impedes the pet from passing through narrow openings or from chewing areas of it's body under medical treatment. The invention at hand is a sphere with a curved outer surface and a smaller comparable radius.

U.S. Pat. No. 5,915,337 refers to an adjustable tubular or cylindrical shaped cervical pet collar. The invention at hand is a nonadjustable sphere.

U.S. Pat. No. 6,044,802 is a soft, round pillow shaped veterinary recovery collar with a central aperture and draw string to adjust to the size of the neck. The invention at hand is a nonadjustable, rigid sphere with two apertures directly opposed to one another.

U.S. Pat. No. 6,129,054 describes a substantially rectangular padded collar which wraps around and contacts an animal's entire neck from mandible to scapula. The overlapping ends of the tubular or cylindrical collar are held in place by one or more inelastic bands. The invention at hand is an unpadded, rigid sphere with internal fasteners and or external fasteners additionally having two openings with curved borders that come in contact with only the upper and lower portions of the neck of a bird.

SUMMARY OF THE INVENTION

The psittacine bird has a large head relative to a long, slender neck. The neck rests in the shape of an "S" curve which may be straightened to increase it's overall length and reach. This allows for fitting of a semi-rigid, hollow, three dimensional cervical collar in the shape of a round, elliptical, or eccentric oval sphere, to restrict the reach of the bird's head and beak below the neck, thereby preventing self-destructive actions of feather picking or self mutilation and serving as an effective restraint to help inhibit removal of bandages or other medically applied devices. However, visual capabilities are not impaired. There is no interference with the movement of appendages.

The description below makes reference to a spherical form or shape. A sphere is defined as a shape which is equidistant in all directions from a central point. However, in the context of the invention at hand, the properties of the sphere as it relates to the avian cervical restraint collar, shall represent any of the three-dimensional shapes having a continuous curved surface including round, elliptical, centric and eccentric oval or multiple combination thereof.

The equator of a round or elliptical sphere is equidistant from either pole of the sphere. The equator of an eccentric oval sphere may be closer to one pole or the other thereby creating a top heavy or bottom heavy sphere. The sphere could even take on the general shape of an hour glass with two wide sections separated by a narrow section.

A hollow, spherical avian cervical restraint collar is formed by engaging two halves of a durable, semi-rigid lightweight, non toxic and solid material such as but not limited to plastic. The two halves of the sphere are held securely in place by internal male fasteners positioned on either or both hemispheres that engage corresponding female receptacles located on the opposing hemisphere.

Alternatively, external fasteners are capable of securing the hemispheres together. Each hemisphere would have one or more screw portals that retain the screw head which will be described below in more detail.

A bird must generate sufficient internally or externally applied forces to the two sections of the spherical avian cervical restraint collar simultaneously to distort the sphere to the point of disengaging the fastener from the receptacle of the locking mechanism. Removal of the collar by the bird in this manner is thus hindered by the overall properties and design of the sphere.

Clear, opaque, or colored semi-rigid non toxic materials may be utilized in construction of a sphere. Optional internal surface raised ribbing may be added to improve structural strength while maintaining a light weight characteristic.

As with prior art forms, different sizes of the spherical avian cervical restraint collar will be required to meet the physical variation of different sized birds. One size does not fit all. The avian cervical restraint collar requires selection of an appropriate size to fit an individual bird. As a general rule of thumb, the diameter of the sphere will approximate the widest diameter of the bird's head excluding the beak. It is further recognized that birds other than psittacines will not necessarily benefit from the application of one or more spherical restraint collars.

DETAILED DESCRIPTION OF THE INVENTION

Figure 1:
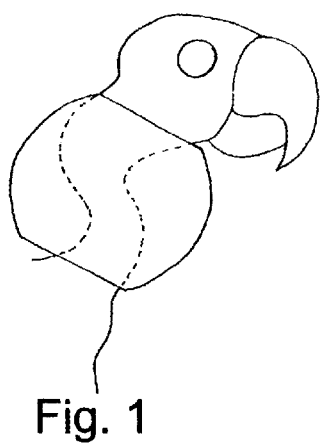
FIG. 1 shows a perspective view of the restraint collar applied to a neck of a bird.

FIG. 1 is a perspective view of the cervical restraint collar as it is applied to the neck of a bird. As can be seen, the neck of this particular bird assumes an "S" shape when relaxed within the collar. However, the neck can be straightened to some extent and yet the bird, with its beak, still cannot reach critical areas of the restraint collar to defeat its purpose and that is to act as a restraint.

Figure 2:
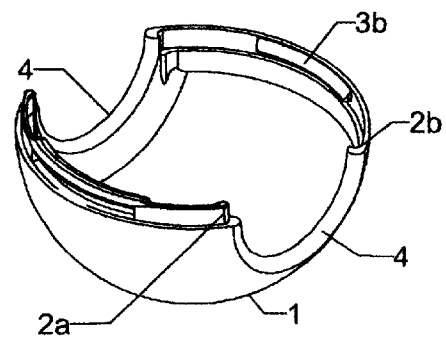
FIG. 2 is a perspective view of one half of the cervical collar.
Figure 3:
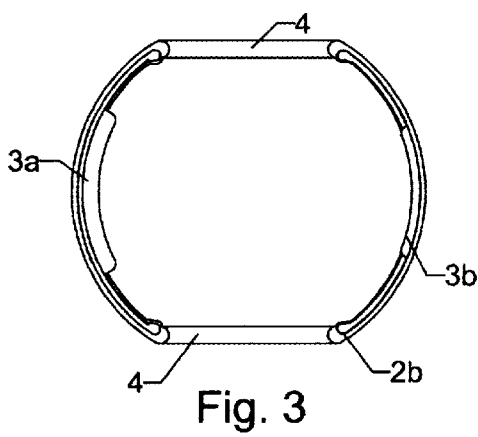
FIG. 3 shows an interior view of an assembled cervical collar.
Figure 4:
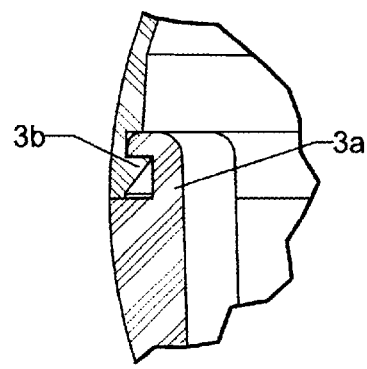
FIG. 4 illustrates a cross sectional view of the locking mechanism.

FIG. 2 shows the greater curvature 1 as forming the outermost boundary of a sphere. The ridge 2b is confluent with the greater curvature 1 of the sphere. The ridge 2a is internal to ridge 2b. There is a female receptacle 3a of the locking mechanism is located on the widened section of ridge 2a. The male fastener 3b of the locking mechanism is located on the internal side of ridge 2b in the position directly opposed to the female receptacle.

Figure 5:
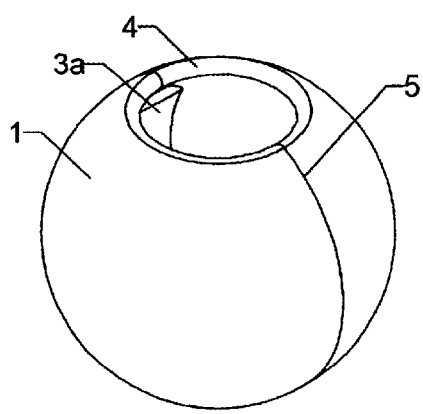
FIG. 5 is a perspective view of the assembled collar.
Figure 12:
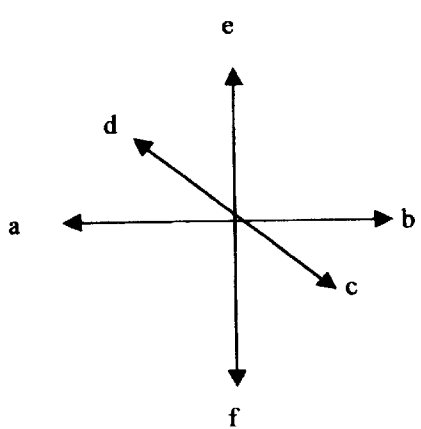
FIG. 12 shows a three-dimensional axis of a collar for a bird.

A sphere of FIG. 5 is formed when two diametrically aligned hemispheres are guided together by sliding ridge 2a of one hemisphere along ridge 2b of the opposite hemisphere with enough force to cause ridge 2a to ride over fastener 3b and enable fastener 3b to engage the receptacle 3a. This secures the two hemispheres together while reinforcing and stabilizing the seam 5.

Once the two hemispheres are engaged, the seam 5 between the two halves of the completed sphere is tight and smooth. This seam follows or is aligned with the head to tail or long axis of the bird's body further making it difficult to get an effective purchase on the outer surface of the spherical collar to inflict damage to the collar itself.

The two hemispheres are positioned with their concave surfaces or interiors opposed to one another with male fasteners and female receptacles aligned. Both hemispheres are pushed together forcing the ridge of each hemisphere's wall to slightly flex and ride along side the opposing ridge until each male fastener engages the opposing female receptacle.

To separate the sphere into the two component hemispheres, a pressure is simultaneously applied to two opposing points on the seam 5 between the hemispheres. As the sphere's outer curvature flexes and distorts, the male fastener is released from its counterpart female receptacle. The two halves are then separated by pulling in opposite directions. The collar's two hemispheres can thus be repeatedly engaged and disengaged.

This internal locking mechanism includes a fastener and receptacle having one or both portions composed of a semi-rigid material capable of flexing or slight distortion and having a memory to return to its original shape so as to secure the protruding fastener of one hemisphere in a slot, depression or void which serves as the receptacle of the opposing and aligned hemisphere. Alternatively, one or more materials with the properties of a non permanent adhesive (eg. Velcro™ or 3M Post-it Note™ adhesive) could engage within the sphere and effectively hold the hemispheres, one to the other, until a sufficient force is applied to separate the non permanent materials. It is the property of the internal locking mechanism being out of the reach of the bird so that internal locks allow all outer surfaces of the spherical collar as well as the borders to the two openings through which the bird's neck passes to have smooth, curved surfaces which, when fitted properly, will discourage or prevent the bird's beak or claws the opportunity to bite or grasp the locks and collar, respectively. The curved borders of the openings further diminish the risk of injury from narrow or sharp edges against the head, neck and torso of the bird.

The thickness or thinness of the greater curvature wall 1 of the sphere influences both the weight and the flexibility of the whole sphere or each component hemisphere. All edges of each hemisphere are strengthened by increasing the thickness of the construction material. Using a lightweight but durable material like plastic allows for the majority of the wall of a sphere to be thinner than the curved border 4 and ridges 2a & 2b of each hemisphere allowing for reduction in overall weight while maintaining strength and flexibility.

Figure 6:
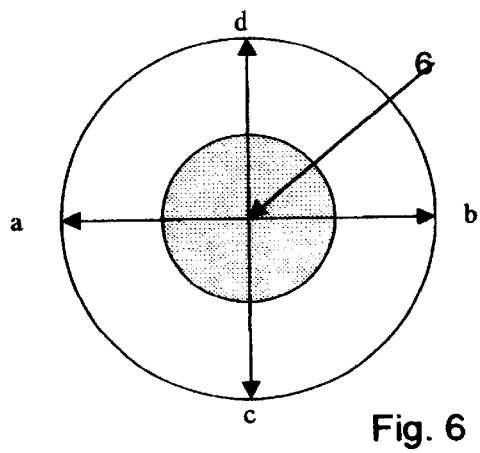
FIG. 6 illustrates a two-dimensional plane.
Figure 7:
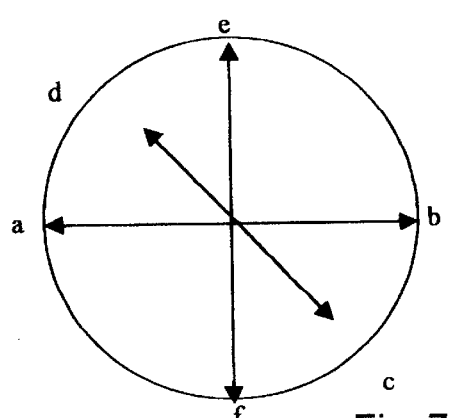
FIG. 7 illustrates a three-dimensional circular sphere.
Figure 8:
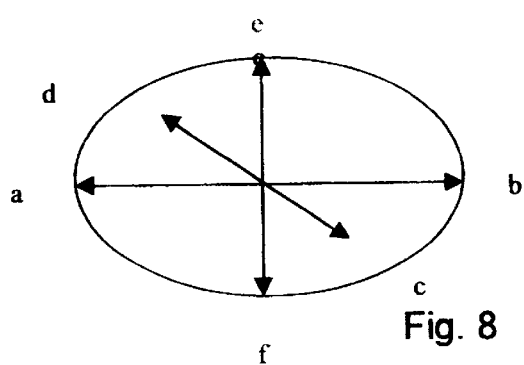
FIG. 8 illustrates a three-dimensional elliptical sphere.

In the context of this description of the cervical restraint collar, a minimum of two of the three dimensions a-b, of the horizontal directions and d-e, the diagonal directions, composing all collars will form a circle as shown in FIG. 6. It is in the center of this circle that a space or void (shaded area 6) is created by the curved border 4 to allow for the bird's neck to be enclosed 360 degrees. The radius of the circle as it moves through the third dimension (as illustrated by line e-f in FIGS. 7, 8 and 9) may increase or decrease in size forming one of many curved shapes widening at one or more positions above and below or at the center point.

Figure 9:
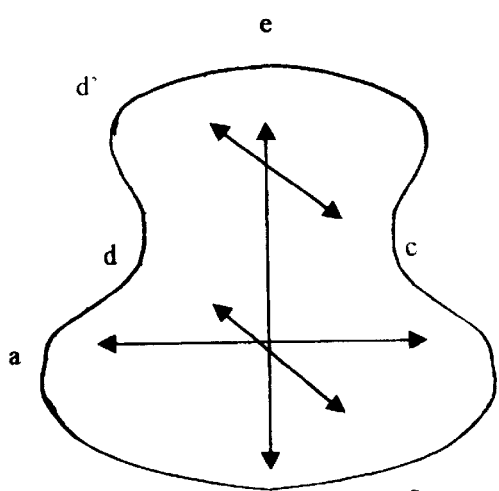
FIG. 9 illustrates a three-dimensional eccentric sphere.

FIG. 9 represents the shape of an approximate hour glass having two widened sections or curves with a narrowing in between. The upper section is shown as having a narrower diameter d'-c' than the lower section d-c. The axis e-f represents a vertical axis while a-b represents the wider section of the hour glass.

Figure 10:
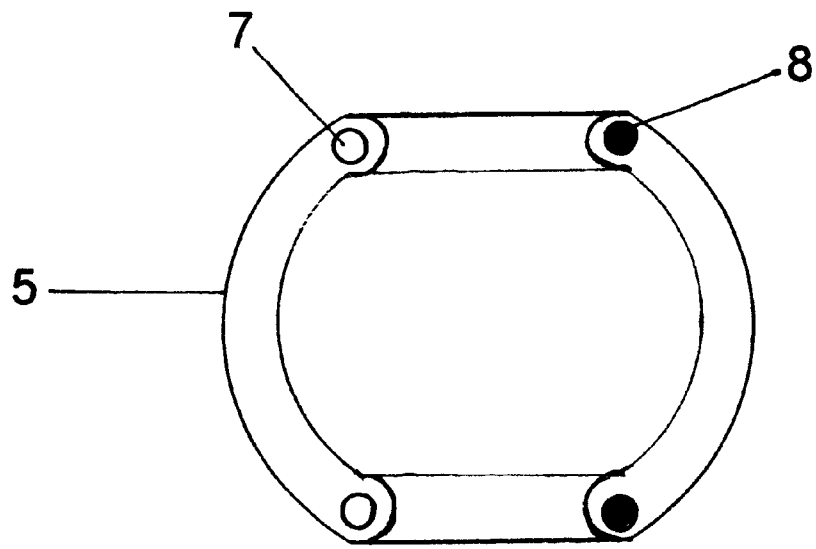
FIG. 10 shows a hemisphere with screw portals.

FIG. 10 shows the proximity of four external screw fasteners. Portal 7 allows a compatibly sized screw to pass through one hemisphere into a female portal 8 of the opposing hemisphere. The threaded screw shaft engages within the threaded female portal 8 on the opposing hemisphere to secure the two hemispheres together. The seam 5 is formed by the union of the two hemispheres. This fastening system may be applied to the spheres with or without an internal locking mechanism.

Figure 11:
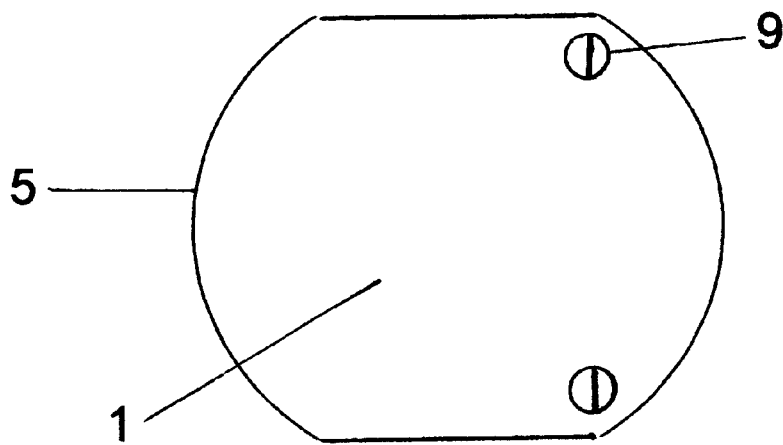
FIG. 11 shows two hemispheres secured together by screws.

FIG. 11 shows a three-dimensional axis illustrating the three axis lines critical to the unique forms and function of the avian cervical restraint collar. Special orientation is represented by three separate and distinct lines connecting a and b, c and d, and e and f. Each line represents widths a-b, depth c-d, and height e-f, respectively. All three lines intersect at their midpoint with the exception of the object illustrated in FIG. 9. Together, all lines indicate a volume in space not yet utilized for psittacine bird cervical restraints.

What I claim is:

1. An avian protective collar adapted to be placed around a neck of a bird, said collar comprising a first component and a second component, a fastening means for connecting said first and second components together, wherein the first and second components when fastened together form a hollow, three dimensional collar having a continuously curved exterior surface and a curved interior surface being substantially congruent to the exterior surface, said collar further comprising two openings through which the neck of the bird is encircled.

2. The avian protective collar of claim 1, wherein said fastening means is a snap fit connection.

3. The avian protective collar of claim 1, wherein said fastening means is a male and female locking mechanism.

4. The avian protective collar of claim 1, wherein said openings have rounded edges.

5. The avian protective collar of claim 1, wherein said collar is of a circular construction.

6. The avian protective collar of claim 1, wherein said collar is of an elliptical construction.

7. The avian protective collar of claim 1, wherein said collar has the shape of an eccentric oval.

8. The avian protective collar of claim 1, wherein said collar has the shape of an hour glass.

9. The avian protective collar of claim 1, wherein said collar is made of a plastic material.

10. The avian protective collar of claim 1, wherein said fastening means is an external screw connection.

11. The avian protective collar of claim 10, wherein said external screw connection for fastening said components together is a male screw of said first component being received in a threaded receptacle in said second component.

* * * * *